United States Patent [19]
Ahluwalia et al.

[11] Patent Number: 5,704,247
[45] Date of Patent: Jan. 6, 1998

[54] COMPACT MANUAL TRANSAXLE FOR MOTOR VEHICLES

[75] Inventors: Pavinder Ahluwalia, Manlius, N.Y.; David Brown, Hopton Diss, United Kingdom

[73] Assignee: New Venture Gear, Inc., Troy, Mich.

[21] Appl. No.: 681,059

[22] Filed: Jul. 22, 1996

[51] Int. Cl.[6] ............................................. F16H 3/08
[52] U.S. Cl. ......................................... 74/331; 74/359
[58] Field of Search ........................... 74/325, 329, 331, 74/359

[56] References Cited

U.S. PATENT DOCUMENTS

| | | | |
|---|---|---|---|
| 4,033,200 | 7/1977 | Stockton | 74/331 |
| 4,174,644 | 11/1979 | Nagy et al. | 74/477 |
| 4,463,622 | 8/1984 | Freiburger | 74/337.5 |
| 4,640,141 | 2/1987 | Knodel et al. | 74/357 |
| 4,738,149 | 4/1988 | Janiszewski | 74/330 |
| 4,738,150 | 4/1988 | Miner | 74/359 |
| 4,776,227 | 10/1988 | Janiszewski | 74/331 |
| 4,780,998 | 11/1988 | Knapp . | |
| 4,799,395 | 1/1989 | Janiszewski | 74/331 |
| 4,802,373 | 2/1989 | Saint-Jean et al. | 74/359 |
| 5,311,789 | 5/1994 | Henzler et al. | 74/331 |
| 5,385,065 | 1/1995 | Hofmann | 74/331 |
| 5,479,835 | 1/1996 | Esparsa et al. | 74/331 |
| 5,495,775 | 3/1996 | Lees et al. | 74/331 |

FOREIGN PATENT DOCUMENTS 2081825   2/1982   United Kingdom .

Primary Examiner—Charles A. Marmor
Assistant Examiner—Sherry Lynn Estremsky
Attorney, Agent, or Firm—Harness, Dickey & Pierce, P.L.C.

[57] ABSTRACT

A compact manual transaxle includes an input shaft having four fixed input gears, a first intermediate shaft rotatably supporting three speed gears meshing with three of the input gears, a second intermediate shaft rotatably supporting a pair of speed gears meshed with two of the input gears and a reverse gear meshed with a speed gear on the first intermediate shaft, and a differential. One speed gear on each of the intermediate shafts meshes with a common input gear. A transfer gear on each intermediate shaft is meshed with a final drive gear fixed to the differential. The transaxle further includes a pair of synchronizer clutches for establishing three forward gears by selectively coupling the three speed gears to the first intermediate shaft and a pair of synchronizer clutches for establishing two forward gears and the reverse gear by selectively coupling the speed gears and reverse gear to the second intermediate shaft.

6 Claims, 3 Drawing Sheets

Fig-1

COMPACT MANUAL TRANSAXLE FOR MOTOR VEHICLES

BACKGROUND OF THE INVENTION

This invention relates generally to manual multi-speed transmissions of the type used in motor vehicles. More specifically, the present invention is directed to a compact manual transaxle having a synchronized reverse gear.

Due to increasing consumer demand for front wheel drive vehicles with more powerful yet fuel-efficient drivetrains, the engine and transaxle must be efficiently packaged to take advantage of all available space within the engine compartment. Concomitantly, most modern transaxles must be capable of providing at least forward five speed ratios. As such, minimizing the overall axial length of the transaxle as well as its shaft center distances is of critical importance to the transmission designer. To meet these requirements, various "three-shaft" type transaxle have been developed. For example, U.S. Pat. No. 4,738,150 discloses a five-speed manual transaxle having an input shaft and a pair of countershafts both of which drive a differential which, in turn, drives a pair of axle half-shafts. Gearsets on both countershafts can be selectively engaged to deliver power from the input shaft to the axle half-shafts. Furthermore, U.S. Pat. Nos. 5,385,065 and 5,495,775 disclose five-speed transaxles having a synchronized reverse gear arrangement.

Accordingly, while such conventional manual transaxle designs attempt to address the packaging requirements mentioned above, a need still exists for development of more compact and robust manual transaxles that can meet the demands of modern front wheel drive vehicular applications.

SUMMARY OF THE INVENTION

The primary object of the present invention is to provide a multi-speed manual transaxle that meets the above-noted needs and improves upon conventional designs.

To this end, the present invention is directed to a five-speed manual transaxle comprising a manual transmission, an input shaft, a first intermediate shaft having a first transfer gear fixed thereto, a first input gear fixed to the input shaft, a first speed gear rotatably supported on the first intermediate shaft and meshed with the first input gear, a second input gear fixed to the input shaft, a second speed gear rotatably supported on the first intermediate shaft and meshed with the second input gear, a first synchronizer clutch for selectively coupling either of the first and second speed gears to the first intermediate shaft, a third input gear fixed to the input shaft, a third speed gear rotatably supported on the first intermediate shaft and meshed with the third input gear, a second synchronizer clutch for selectively coupling the third speed gear to the first intermediate shaft, a second intermediate shaft having a second transfer gear fixed thereto, a fourth speed gear rotatably supported on the second intermediate shaft and meshed with the third input gear, a third synchronizer clutch for selectively coupling the fourth speed gear to the second intermediate shaft, a fourth input gear fixed to the input shaft, a fifth speed gear rotatably supported on the second intermediate shaft and meshed with the fourth input gear, a reverse gear rotatably supported on the second intermediate shaft and meshed with the first speed gear, a fourth synchronizer clutch for selectively coupling either of the fifth speed gear and the reverse gear to the second intermediate shaft, and a final drive gear meshed with the first and second transfer gears.

BRIEF DESCRIPTION OF THE DRAWINGS

Further objects, features and advantages of the present invention will become apparent to those skilled in the art from studying the following description and the accompanying drawings in which.

DETAILED DESCRIPTION OF THE PREFERRED EMBODIMENT

Figure 1:
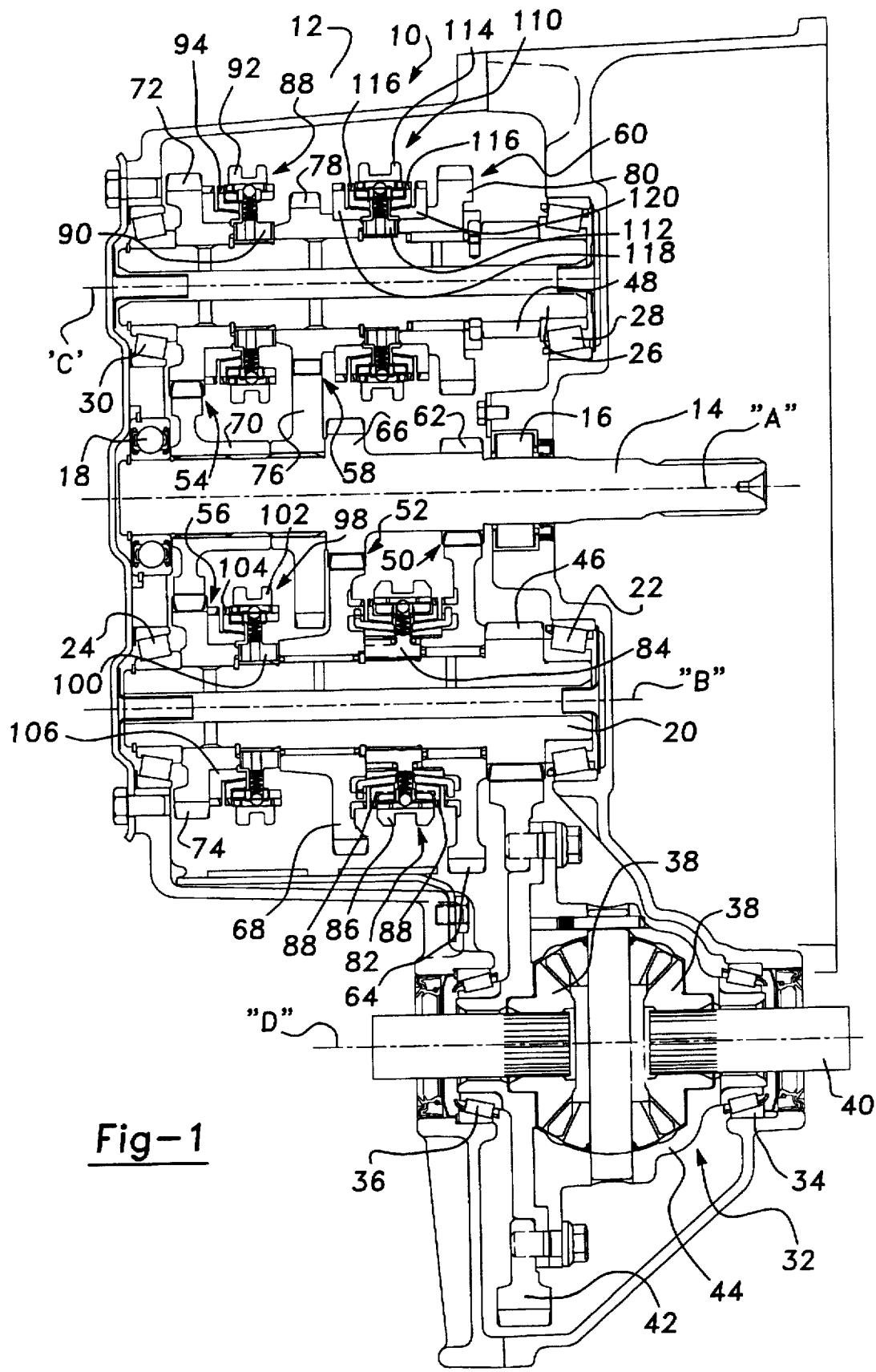
FIG. 1 is a sectional view of a five-speed manual transaxle constructed according to a preferred embodiment of the present invention.
Figure 2:
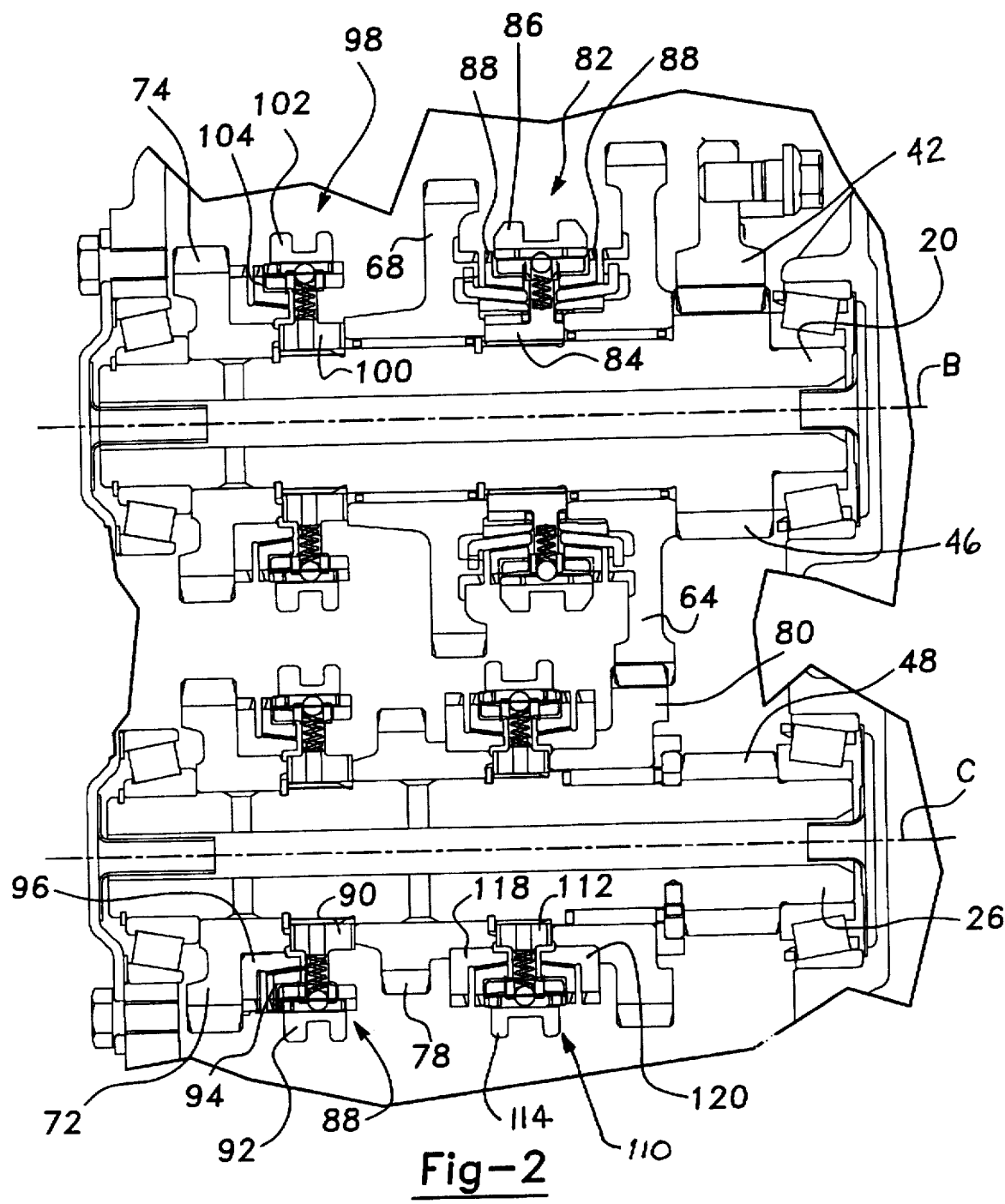
FIG. 2 is a partial sectional view of the five-speed manual transaxle shown in FIG. 1.

Referring now to the drawings, a manual transaxle 10 is shown that is adapted for use in front wheel drive motor vehicles. Transaxle 10 is a five-speed arrangement having all of its forward and reverse gears synchronized and yet is efficiently packaged to provide a compact gearbox.

Figure 3:
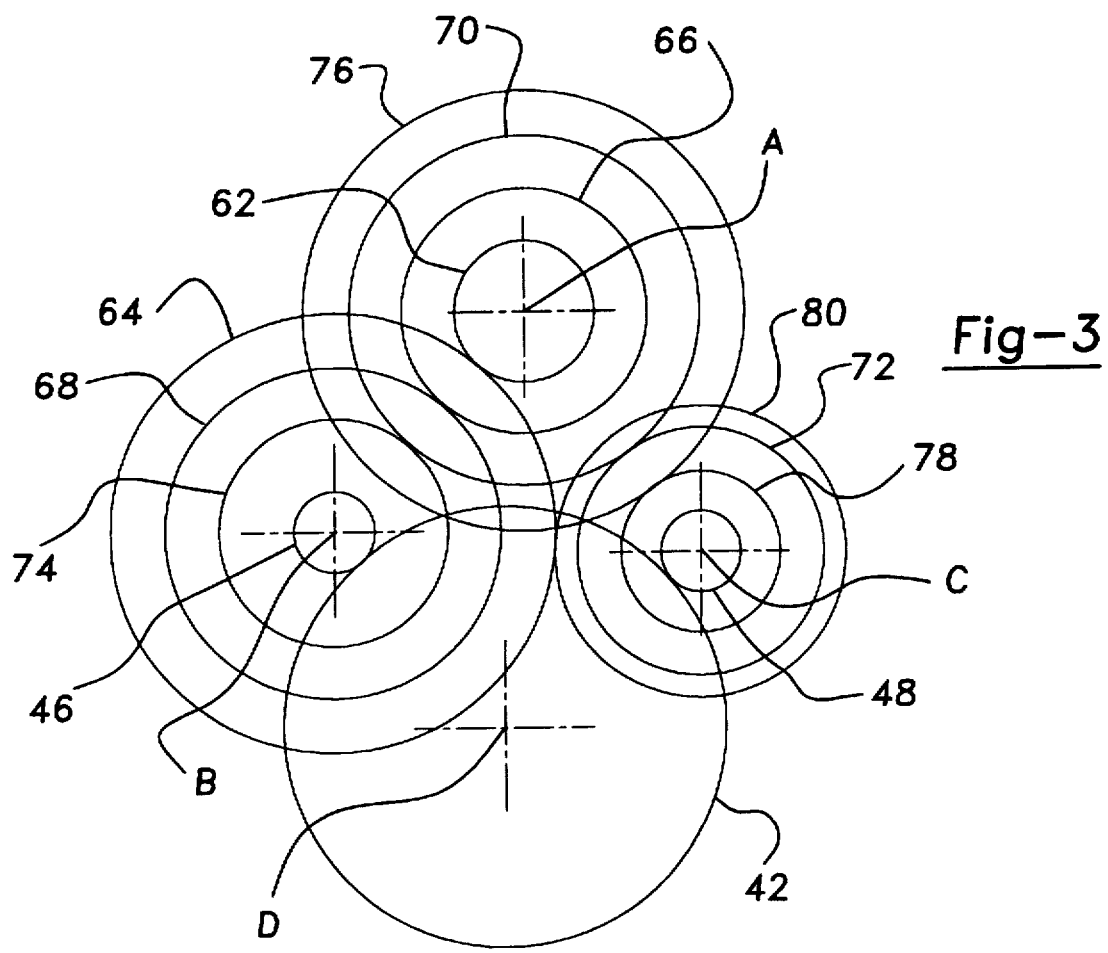
FIG. 3 is a schematic view showing the shaft and gear arrangement of the transmission shown in FIG. 1.

With particular reference to FIG. 1, transaxle 10 is shown to include a housing 12 within which an input shaft 14 is rotatably supported by bearings 16 and 18 for rotation about a first axis "A". As is conventional, input shaft 14 is adapted to be driven through a suitable manually-released clutch (not shown) by the vehicles's engine. Transaxle 10 is also shown to include a first driven or intermediate shaft 20 rotatably supported in housing 12 by bearings 22 and 24 for rotation about second axis "B", a second driven or intermediate shaft 26 rotatably supported in housing 12 by bearings 28 and 30 for rotation about a third axis "C", and a differential 32 supported in housing 12 by bearings 34 and 36 for rotation about a fourth axis "D". As is also conventional, the output of differential 32 includes a pair of axially-aligned side gears 38 to which axle half-shafts 40 are fixed so as to connect differential 32 to the driving wheels of the motor vehicle. The input to differential 32 is a final drive gear 42 fixed to differential cage 44 and which is in constant meshed engagement with a first transfer gear 46 fixed to first intermediate shaft 20 as well as with a second transfer gear 48 fixed to second intermediate shaft 26. It will be appreciated that FIG. 1 is a so-called "unrolled" sectional view wherein shafts 14, 20, 26 and 40 are all arranged in a single plane. However, in reality, these shafts are compactly arranged in a parallel relationship relative to each other, with no three shafts aligned in a common plane, as is shown in FIG. 3. In this manner, the center distances between the shafts can be effectively minimized.

Transaxle 10 includes a series of constant-mesh gearsets 50, 52, 54, 56, 58 and 60 that can be selectively engaged for establishing five forward speed ratios as well as a reverse speed ratio between input shaft 14 and final drive gear 42. Gearset 50 includes a first input gear 62 fixed to input shaft 14 and a first speed gear 64 rotatably supported on first intermediate shaft 20. First speed gear 64 is in constant mesh with first input gear 62 for defining a first power transmission path that can be selectively engaged to establish a first forward speed ratio. Gearset 52 includes a second input gear 66 fixed to input shaft 14 that is in constant mesh with a second speed gear 68 rotatably supported on first intermediate shaft 20. Thus, gearset 52 functions to define a second power transmission path that can be selectively engaged to establish a second forward speed ratio. Gearset 54 includes a third input gear 70 fixed to input shaft 14 that is in constant mesh with a third speed gear 72 rotatably supported on second intermediate shaft 26. As such, gearset 54 functions to define a third power transmission path that can be selectively engaged to establish a third forward speed ratio. Gearset 56 includes a fourth speed gear 74 rotatably supported on first intermediate shaft 20 that is also in constant mesh with third input gear 70. Thus, gearset 56 functions to define a fourth power transmission path that can be selectively engaged to establish a fourth forward speed ratio. Gearset 58 includes a fourth input gear 76 fixed to input shaft 14 that is in constant mesh with a fifth speed gear 78 rotatably supported on second intermediate shaft 26. Gearset 56 functions to define a fifth power transmission path that can be selectively engaged to establish a fifth forward speed ratio. Finally, gearset 60 includes a reverse gear 80 rotatably supported on second intermediate shaft 26 that is in constant mesh with first speed gear 64. As such, gearset 60 defines a sixth power transmission path that can be selectively engaged to establish the reverse speed ratio.

To provide means for establishing the various forward and reverse speed ratios by selectively engaging one of the available power transmission paths, each gearset is associated with a synchronizer clutch. In particular, a first synchronizer clutch 82 is operably located between first and second speed gears 64 and 68 and includes a hub 84 fixed to first intermediate shaft 20, a shift sleeve 86 mounted for rotation with and axial sliding movement on hub 84, and a pair of suitable blocker-type synchronizers 88 interposed between shift sleeve 86 and speed gears 64 and 68. First synchronizer clutch 82 is of the double-acting variety such that forward axial movement of shift sleeve 86 from its centered neutral position shown is adapted to couple first speed gear 64 to first intermediate shaft 20 for establishing the first forward speed ratio in which first transfer gear 46 drives final drive gear 42. Moreover, rearward axial movement of shift sleeve 86 from its neutral position is adapted to couple second speed gear 68 to first intermediate shaft 20 such that first transfer gear 46 drives final drive gear 42 at the second forward speed ratio.

To establish the third forward speed ratio, a second synchronizer clutch 88 is located adjacent to third speed gear 72 and includes a hub 90 fixed to second intermediate shaft 26, a shift sleeve 92 mounted for rotation with and axial sliding movement on hub 90, and a blocker-type synchronizer 94 interposed between shift sleeve 92 and a clutch gear 96 fixed to third speed gear 72. Second synchronizer clutch 88 is of the single-acting type such that rearward movement of shift sleeve 92 from its centered neutral position shown is adapted to couple third speed gear 72 to second intermediate shaft 26 such that second transfer gear 48 drives final drive gear 42 at the third speed ratio.

To establish the fourth speed ratio, a third synchronizer clutch 98 is located adjacent to fourth speed gear 74 and includes a hub 100 fixed to first intermediate shaft 20, a shift sleeve 102 mounted for rotation with and axially sliding movement on hub 100, and a blocker-type synchronizer 104 interposed between shift sleeve 102 and a clutch gear 106 fixed to fourth speed gear 74. Rearward sliding movement of shift sleeve 102 from its centered neutral position shown causes it to couple fourth speed gear 74 to first intermediate shaft 20 such that first transfer gear 46 drives final drive gear 42 at the fourth forward speed ratio.

The fifth forward speed ratio and the reverse speed ratio are established via a fourth synchronizer clutch 110, also of the double-acting variety, that is located between fifth speed gear 78 and reverse gear 80. Fourth synchronizer clutch 110 includes a hub 112 fixed to second intermediate shaft 26, a shift sleeve 114 mounted for rotation with and axial sliding movement on hub 112, and a pair of blocker-type synchronizers 116 interposed between shift sleeve 114 and gears 78 and 80. Rearward sliding movement of shift sleeve 114 from its centered neutral position shown is adapted to couple a clutch gear 118 fixed to fifth speed gear 78 to second intermediate shaft 26 such that second transfer gear 48 drives final drive gear 42 at the fifth speed ratio. In contrast, forward sliding movement of shift sleeve 114 from its neutral position couples it to a clutch gear 120 fixed to reverse gear 80 such that reverse gear 80 is releasably coupled to second intermediate shaft 26. As such, second transfer gear 48 drives final drive gear 42 at the reverse speed ratio and in the opposite direction with respect to the normal direction of rotation of final drive gear 42 during forward operation. This reversal of direction results from reverse gear 80 being driven by first speed gear 64 which, in turn, is driven by first input gear 62.

In the first forward gear, torque is delivered from input shaft 14 to differential 32 through elements 62, 64, 86, 84, 20, 46 and 42. In the second forward gear, torque is delivered from input shaft 14 to differential 32 through elements 66, 68, 86, 84, 20, 46 and 42. In the third forward gear, torque is delivered from input shaft 14 to differential 32 through elements 70, 72, 92, 90, 26, 48 and 42. In the fourth forward gear, torque is delivered from input shaft 14 to differential 32 through elements 70, 74, 102, 100, 20, 46 and 42. In the fifth forward gear, torque is delivered from input shaft 14 to differential 32 through elements 76, 78, 114, 112, 26, 48 and 42. Finally, in the reverse gear, torque is delivered from input shaft 14 to differential 32 through elements 62, 64, 80, 114, 112, 26, 48, and 42. In the presently preferred embodiment, speed gears 72 and 74 are identical and transfer gears 46 and 48 have differing numbers of teeth.

Figure 4:
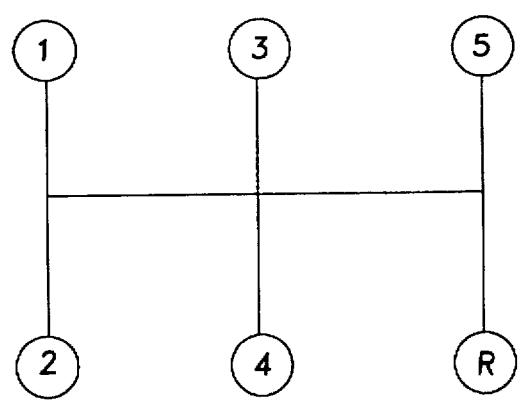
FIG. 4 is a shift gate diagram for the transaxle shown in FIG. 1.

FIG. 3 is a schematic illustration of the arrangement of shafts 14, 20, 26 and 40 and of the meshing of the various gearsets. In addition, a shift pattern or gate diagram for transaxle 10 is shown in FIG. 4. Obviously, any suitable shift system coupling each of shift sleeves 86, 42, 102 and 114 to a gearshift lever (not shown) for coordinated movement to establish the various forward and reverse gears can be used with transaxle 10.

The foregoing discussion discloses and describes a preferred embodiment of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A manual transmission comprising:

an input shaft;

a first intermediate shaft having a first transfer gear fixed thereto;

a first input gear fixed to said input shaft;

a first speed gear rotatably supported on said first intermediate shaft and meshed with said first input gear;

a second input gear fixed to said input shaft;

a second speed gear rotatably supported on said first intermediate shaft and meshed with said second input gear;

a first synchronizer clutch for selectively coupling either of said first and second speed gears to said first intermediate shaft;

a third input gear fixed to said input shaft;

a third speed gear rotatably supported on said first intermediate shaft and meshed with said third input gear;

a second synchronizer clutch for selectively coupling said third speed gear to said first intermediate shaft;

a second intermediate shaft having a second transfer gear fixed thereto;

a fourth speed gear rotatably supported on said second intermediate shaft and meshed with said third input gear;

a third synchronizer clutch for selectively coupling said fourth speed gear to said second intermediate shaft;

a fourth input gear fixed to said input shaft;

a fifth speed gear rotatably supported on said second intermediate shaft and meshed with said fourth input gear;

a reverse gear rotatably supported on said second intermediate shaft and meshed with said first speed gear;

a fourth synchronizer clutch for selectively coupling either of said fifth speed gear and said reverse gear to said second intermediate shaft; and a final drive gear meshed with said first and second transfer gears.

2. The manual transmission of claim 1 further comprising a differential driven by said final drive gear.

3. The manual transmission of claim 1 wherein said first synchronizer clutch includes a first shift sleeve mounted for rotation with said first intermediate shaft and movable from a neutral position in a first direction for selectively engaging said first speed gear so as to establish a first forward speed ratio, and wherein said first shift sleeve is movable in a second direction from its neutral position for selectively engaging said second speed gear for establishing a second forward speed ratio.

4. The manual transmission of claim 3 wherein said second synchronizer clutch includes a second shift sleeve mounted for rotation with said first intermediate shaft and movable from a neutral position in a first direction to selectively engage said third speed gear for establishing a third speed ratio, and wherein said third synchronizer clutch includes a third shift sleeve mounted for rotation with said second intermediate shaft and movable from a neutral position in a first direction for selectively engaging said fourth speed gear for establishing a fourth forward speed ratio.

5. The manual transmission of claim 4 wherein said fourth forward speed ratio is lower than said third forward speed ratio.

6. The manual transmission of claim 4 wherein said fourth synchronizer clutch includes a fourth shift sleeve mounted for rotation with said second intermediate shaft and movable from a neutral position in a first direction for selectively engaging said fifth speed gear for establishing a fifth forward speed ratio, and wherein said fourth shift sleeve is movable from said neutral position in a second direction for selectively engaging said reverse gear for establishing a reverse gear ratio.

* * * * *